US007533180B2

(12) United States Patent
Ebihara et al.

(10) Patent No.: US 7,533,180 B2
(45) Date of Patent: *May 12, 2009

(54) INFORMATION-PROCESSING DEVICE, INFORMATION-PROCESSING METHOD, RECORDING MEDIUM, AND PROGRAM

(75) Inventors: Munetake Ebihara, Kanagawa (JP); Itaru Kawakami, Kanagawa (JP); Ryuji Ishiguro, Tokyo (JP); Mitsuru Tanabe, Kanagawa (JP); Yuichi Ezura, Kanagawa (JP); Ichiro Sato, Chiba (JP)

(73) Assignee: Sony Corporation, Tokyo (JP)

( * ) Notice: Subject to any disclaimer, the term of this patent is extended or adjusted under 35 U.S.C. 154(b) by 605 days.

This patent is subject to a terminal disclaimer.

(21) Appl. No.: 10/114,266

(22) Filed: Apr. 3, 2002

(65) Prior Publication Data
US 2002/0147821 A1 Oct. 10, 2002

(30) Foreign Application Priority Data
Apr. 4, 2001 (JP) ............................. 2001-105851

(51) Int. Cl.
G06F 15/16 (2006.01)
(52) U.S. Cl. ...................... 709/229; 709/223; 709/224; 709/225
(58) Field of Classification Search ................. 709/205, 709/203, 228–229, 217–219, 223–225
See application file for complete search history.

(56) References Cited

U.S. PATENT DOCUMENTS

| | | | | |
|---|---|---|---|---|
| 5,629,980 A * | 5/1997 | Stefik et al. | .................... | 705/54 |
| 5,949,875 A * | 9/1999 | Walker et al. | .................. | 702/78 |
| 5,953,005 A * | 9/1999 | Liu | .......................... | 715/500.1 |
| 6,009,401 A * | 12/1999 | Horstmann | ..................... | 705/1 |
| 6,321,256 B1 * | 11/2001 | Himmel et al. | ............. | 709/218 |
| 6,359,900 B1 * | 3/2002 | Dinakar et al. | .............. | 370/458 |
| 6,574,377 B1 * | 6/2003 | Cahill et al. | ................. | 382/305 |
| 6,615,190 B1 * | 9/2003 | Slater | ......................... | 705/41 |
| 6,785,723 B1 * | 8/2004 | Genty et al. | ................. | 709/224 |
| 6,802,000 B1 * | 10/2004 | Greene et al. | ............... | 713/168 |
| 6,847,950 B1 * | 1/2005 | Kamibayashi et al. | ........ | 705/57 |
| 6,859,790 B1 * | 2/2005 | Nonaka et al. | ................ | 705/51 |
| 6,910,022 B2 * | 6/2005 | Stefik et al. | .................... | 705/50 |
| 6,934,693 B2 * | 8/2005 | Stefik et al. | .................... | 705/51 |
| 7,006,424 B2 * | 2/2006 | Nonaka et al. | ................. | 369/84 |
| 2002/0016162 A1 * | 2/2002 | Yoshihara et al. | ........... | 455/412 |
| 2002/0071559 A1 * | 6/2002 | Christensen et al. | ........ | 380/277 |
| 2002/0116082 A1 * | 8/2002 | Gudorf | ......................... | 700/94 |
| 2002/0157002 A1 * | 10/2002 | Messerges et al. | .......... | 713/155 |

FOREIGN PATENT DOCUMENTS

WO WO 00/67256 11/2000

* cited by examiner

*Primary Examiner*—Saleh Najjar
*Assistant Examiner*—Faruk Hamza
(74) *Attorney, Agent, or Firm*—Oblon, Spivak, McClelland, Maier & Neustadt, P.C.

(57) ABSTRACT

There is provided a personal computer which increments and thereby restores a lendable number upon receiving a content returned from a portable device, and which confirms the return of the content and increments the lendable number even when the portable device does not have or deletes the content borrowed from the personal computer before returning the content.

10 Claims, 15 Drawing Sheets

FIG. 5

| ID OF TRACK | ID OF BORROWER | | |
|---|---|---|---|
| ⋮ ID OF TRACK ⋮ | ID OF PORTABLE DEVICE | | - - - - - |

INFORMATION-PROCESSING DEVICE, INFORMATION-PROCESSING METHOD, RECORDING MEDIUM, AND PROGRAM

BACKGROUND OF THE INVENTION

1. Field of the Invention

The present invention relates to an information-processing device, an information-processing method, a recording medium, and a program. Particularly, the present invention relates to an information-processing device, an information-processing method, a recording medium, and a program, which allow for returning content borrowed by a borrower to a lender even when the borrower does not have the content.

2. Description of the Related Art

As digital technology progresses, it becomes possible to store and reproduce content such as music or video without decreasing the quality thereof.

However, because of such technological advances, it becomes also possible to lend and borrow such content in an illegal manner. Accordingly, in general content-lending systems comprising a lender and a borrower of content, the borrower cannot borrow the content from the lender more than a predetermined number of times (hereinafter referred to as the lendable number) to prevent illegal lending.

More specifically, every time the borrower borrows the content from the lender, the lendable number, which is controlled by the lender, is decremented. After the content is lent repeatedly and when the lendable number becomes zero, the borrower is prevented from borrowing the content.

For returning the content, a predetermined processing (hereinafter referred to as the known return processing) is performed by the lender and the borrower. Subsequently, the content held by the borrower is deleted, and the lendable number controlled by the lender is incremented and is thereby restored.

However, when the device of the borrower is incorrectly formatted, the device may delete the contents before the known return processing is performed. In such case, since the borrower does not have the content, the known return processing is not properly performed. That is to say, the lender cannot increment or restore the lendable number that was decremented for lending the content and thereby loses the chance of lending as many times as the unrestored lendable number.

SUMMARY OF THE INVENTION

To this end, the present invention is achieved to allow for returning the content, and for restoring the lendable number even when the borrower does not have the content to be returned before return processing is performed.

There is provided an information-processing device comprising a first transmission unit for transmitting a content and information necessary for using the content to a device using the content and a controlling unit for controlling lending of the content on the basis of a lendable number, which shows the number of times the content can be lent. The controlling unit comprises a first execution unit for decrementing the lendable number each time the first transmission unit transmits the content and the information necessary for using the content to the device using the content. The controlling unit further comprises a second execution unit for confirming that the device using the content does not have the information, and for incrementing the lendable number on the basis of the result of the confirmation.

Preferably, the controlling unit further comprises a second transmission unit which enciphers a random number and the information necessary for using the content by using a common key that can be used only by the controlling unit and the device using the content, and which transmits the enciphered random number and the enciphered information to the device using the content. The second execution unit of the controlling unit may increment the lendable number upon receiving the plain text of the random number transmitted from the device using the content when the device using the content does not have the information necessary for using the content.

Preferably, the controlling unit further comprises a writing unit for writing the name of the content transmitted from the first transmission unit to the device using the content in a right-controlling list controlled by the device using the content. The second execution unit of the controlling unit may increment the lendable number when the name of the content is not written in the right-controlling list.

There is provided an information-processing method comprising a first transmission step for transmitting a content and information necessary for using the content to a device using the content, and a controlling step for controlling lending of the content on the basis of a lendable number, which shows the number of times the content can be lent. The controlling step comprises a first execution step for decrementing the lendable number each time the content and the information necessary for using the content are transmitted to the device using the content at the first transmission step. The controlling step further comprises a second execution step for confirming that the device for using the content does not have the information and for incrementing the lendable number on the basis of the result of the confirmation.

There is provided a recording medium storing a program readable by a computer. The program comprises a first transmission step for transmitting a content and information necessary for using the content to a device using the content and a controlling step for controlling lending of the content on the basis of a lendable number, which shows the number of times the content can be lent. The controlling step comprises a first execution step for decrementing the lendable number each time the content and the information necessary for using the content are transmitted to the device using the content at the first transmission step. The controlling step further comprises a second execution step for confirming that the device using the content does not have the information and for incrementing the lendable number on the basis of the result of the confirmation.

There is provided a program that makes a computer execute processing which comprises a first transmission step for transmitting a content and information necessary for using the content to a device using the content, and a controlling step for controlling lending of the content on the basis of a lendable number, which shows the number of times the content can be lent. The controlling step comprises a first execution step for decrementing the lendable number each time the content and the information necessary for using the content are transmitted to the device using the content at the first transmission step. The controlling step further comprises a second execution step for confirming that the device using the content does not have the information and for incrementing the lendable number on the basis of the result of the confirmation.

In the information-processing device, the information-processing method, and the program according to the present invention, the content and the information necessary for using the content are transmitted to the device using the content. Lending of the content is controlled on the basis of the lendable number showing the number of times the content can be lent, and the lendable number is decremented each time the content and the information necessary for using the content are transmitted to the device using the content. Then, it is confirmed that the device using the content does not have the information necessary for using the content. On the basis of the result of the confirmation, the lendable number is incremented. Accordingly, the content can be returned even when the device using the content does not have the content.

BRIEF DESCRIPTION OF THE DRAWINGS

FIG. 5 shows a lending list;

DESCRIPTION OF THE PREFERRED EMBODIMENTS

Figure 1:
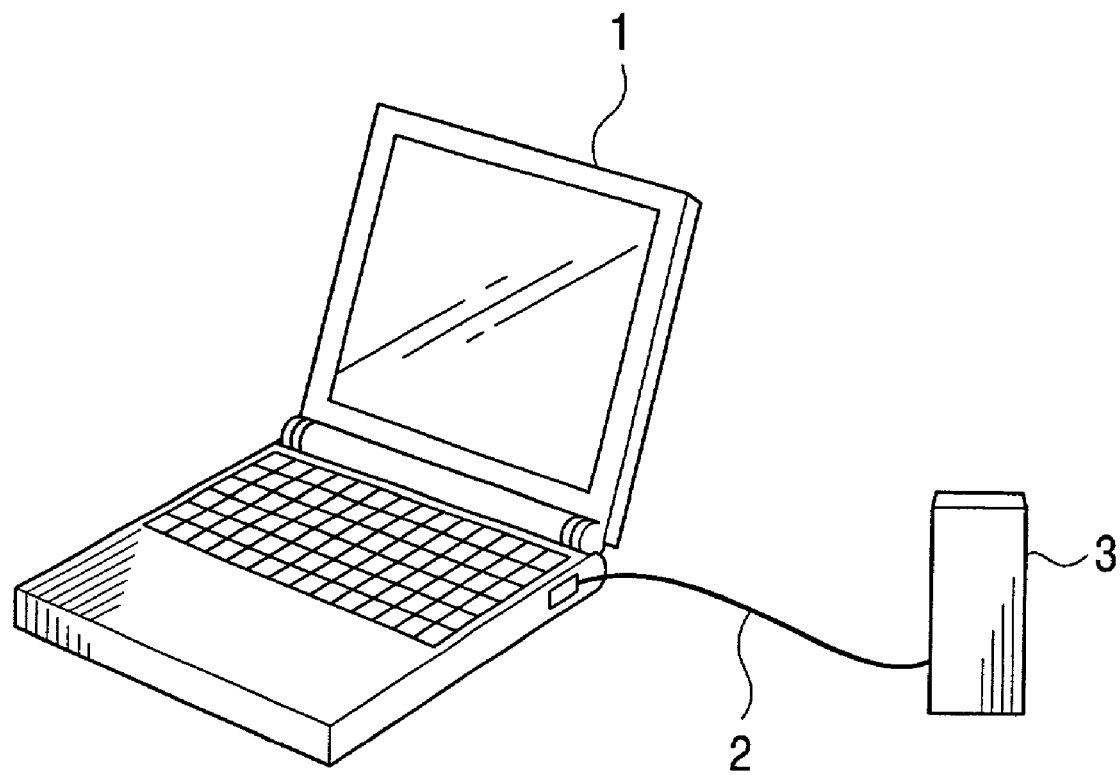
FIG. 1 illustrates the configuration of an exemplary content-lending system according to the present invention.

FIG. 1 illustrates the configuration of an exemplary content-lending system according to the present invention. Incidentally, the word "system" is used as a generic name of a device having a plurality of devices.

A personal computer 1 is connected to a portable device 3 via an USB cord 2.

The content of the personal computer 1 can be lent as many times as predetermined lendable times, and the personal computer 1 controls lending of the content on the basis of the lendable times. Incidentally, the personal computer 1 contains a music track in this example.

That is to say, the personal computer 1 decrements the lendable number when it transmits the data of the content to the portable device 3. This transmission is performed for lending the content.

When the content is returned, the personal computer 1 increments or restores the lendable number. However, if the lent content did not exist or has been deleted by the portable device 3, the personal computer 1 confirms the return of the content and increments the lendable number.

The portable device 3 stores the content lent from the personal computer 1 and reproduces it as required.

Figure 2:
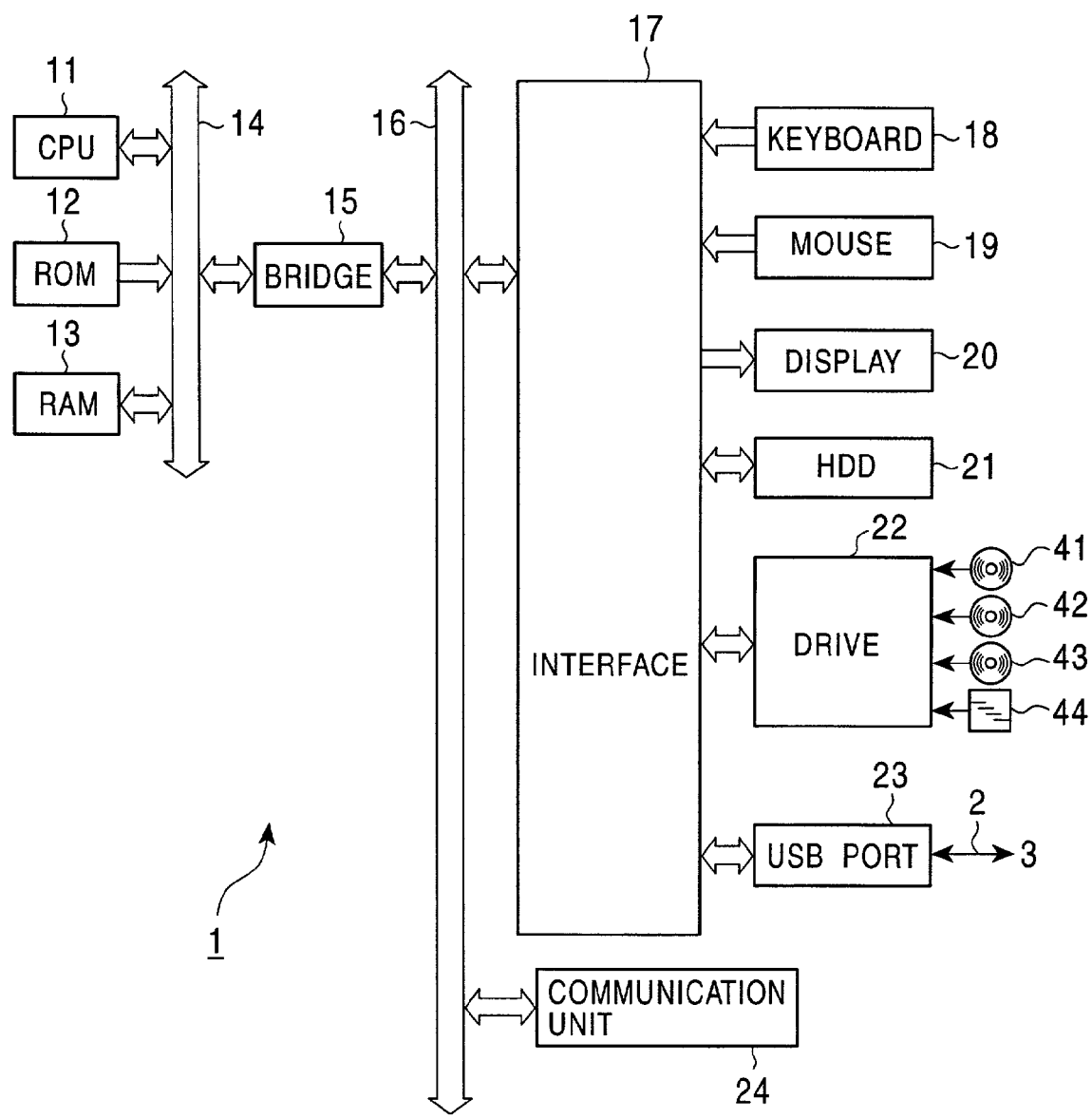
FIG. 2 is a block diagram illustrating the configuration of an exemplary personal computer 1 shown in FIG. 1.

FIG. 2 illustrates the configuration of the personal computer 1.

A central processing unit (CPU) 11 executes various kinds of application programs and operating systems (OS). A read-only memory (ROM) 12 generally stores fixed data of the programs and parameters for calculations that are used by CPU 11. A random-access memory (RAM) 13 stores the program that is executed by the CPU 11 and parameters that change in accordance with the execution. CPU 11 is connected to the RAM 13 via a host bus 14 comprising a CPU bus or the like.

The host bus 14 is connected to an external bus such as a peripheral component interconnect/interface (PCI) bus 16 via a bridge 15.

A user operates a keyboard 18 when he/she inputs various kinds of commands to the CPU 11. The user also operates a mouse 19 when he/she makes an instruction or selects a point on a display 20. The display 20 comprises a liquid crystal display or a cathode-ray tube (CRT), and displays various kinds of information using text and an image.

A hard disc drive (HDD) 21 drives hard discs and makes them store or reproduce information or programs executed by the CPU 11.

A drive 22 reads out data, or a program that is recorded on a magnetic disc 41, an optical disc 42 including a compact disc (CD), a magneto-optical disc 43, or a semiconductor memory 44, which are mounted thereon, and transmits the data, or the program to the RAM 13 via an interface 17, the external bus 16, the bridge 15, and the host bus 14.

The data or the like of content that are to be lent to the portable device 3 may be stored in the HDD 21, the magnetic disc 41, or the semiconductor memory 44.

The portable device 3 is connected to a USB port 23 via a USB cord 2. The USB port 23 outputs the data transmitted from the HDD 21, CPU 11, or the RAM 13 to the portable device 3, via the interface 17, the external bus 16, a bridge 15, and the host bus 14.

The keyboard 18 and the USB port 23 are connected to the interface 17, which is connected to the CPU 11 via the external bus 16, the bridge 15, and the host bus 14.

A communication unit 24 is connected to a network, which is not shown. The communication unit 24 stores the data transmitted from the CPU 11 in a predetermined type of packet, transmits the data via the network, and outputs the data stored in the packet received via the network to the CPU 11, the RAM 13, and the HDD 21.

Figure 3:
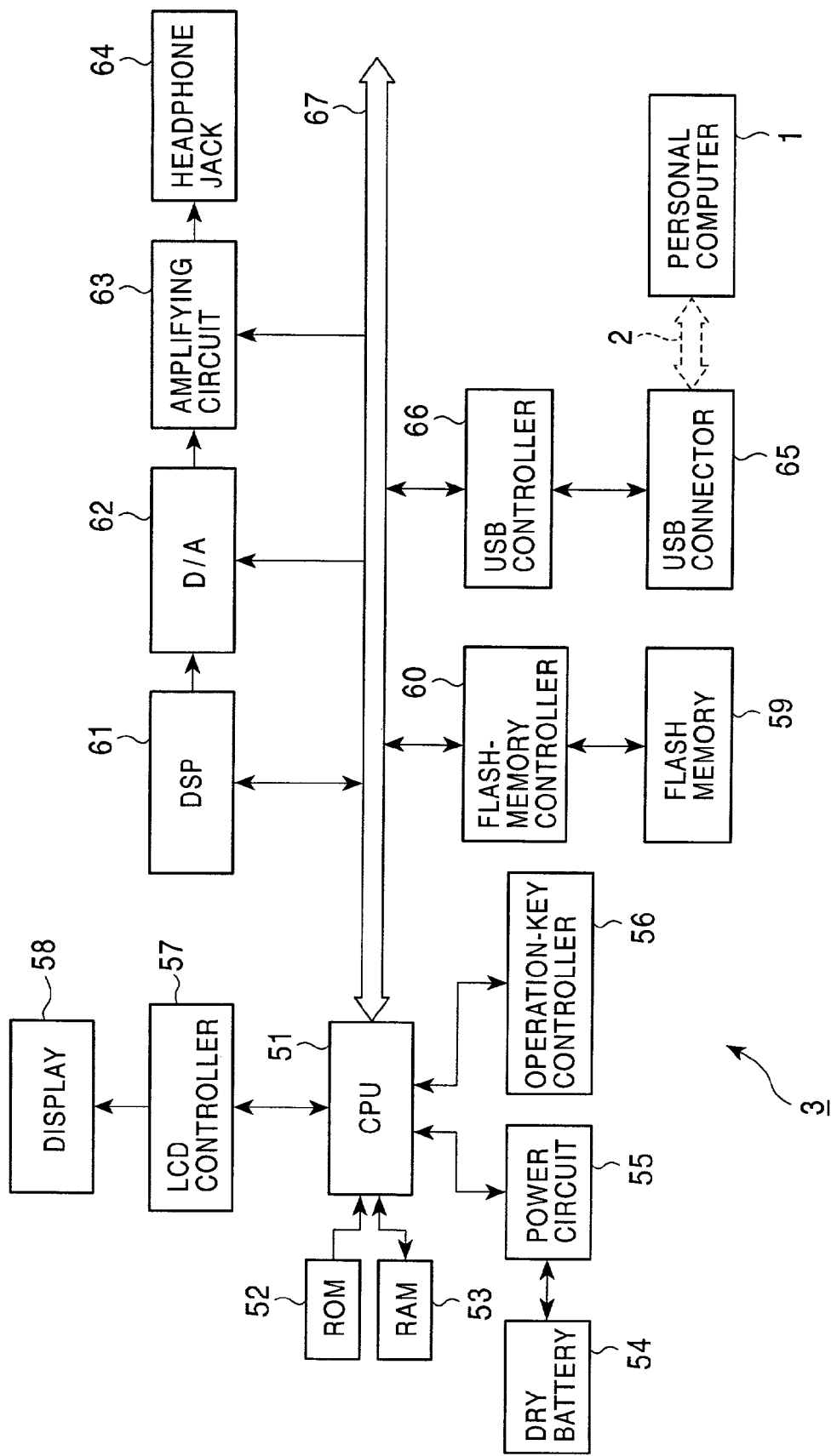
FIG. 3 is a block diagram illustrating the configuration of an exemplary portable device 3 shown in FIG. 1.

FIG. 3 illustrates the configuration of an exemplary portable device 3 according to the present invention.

A CPU 51 executes a program stored in a ROM 52. In a RAM 53, data or the like necessary for the execution is stored as required.

A power circuit 55 converts power voltage supplied from a dry battery 54 to internal power of a predetermined voltage, transmits it to each unit and thereby drives the whole portable device 3.

An operation-key controller 56 transmits a signal corresponding to the operation done by an operation unit that is not shown to the CPU 51. An LCD controller 57 displays the data transmitted from the CPU 51 by text or an image, on a display 58 comprising an LCD or the like.

A flash-memory controller 60 writes data or the like of the content transmitted from the personal computer 1 in a flash memory 59, for example. Further, the flash memory 59 stores a reproduction code that expands the content compressed in a predetermined compression system therein. The flash memory 59 may be formed as a memory card that can be mounted on or dismounted from the portable device 3.

A DSP 61 detects an error in the content in a cyclic-redundancy checking (CRC) system on the basis of the reproduction code transferred from the flash memory 59, reproduces the content, and transmits it to a digital/analog (DA) conversion circuit 62.

The DA conversion circuit 62 converts the reproduced content to an analog voice signal and transmits it to an amplifying circuit 63. The amplifying circuit 63 amplifies the video signal and transmits it to a headphone (not shown) via a headphone jack 64.

A USB controller 66 transmits the data including the content transferred from the personal computer 1 via a USB connector 65 to the CPU 51 via an internal bus 67.

To the internal bus 67, not only the CPU 51, but also the flash-memory controller 60, the DSP 61, the DA conversion circuit 62, the amplifying circuit 63, and the USB controller 66 are connected.

Figure 4:
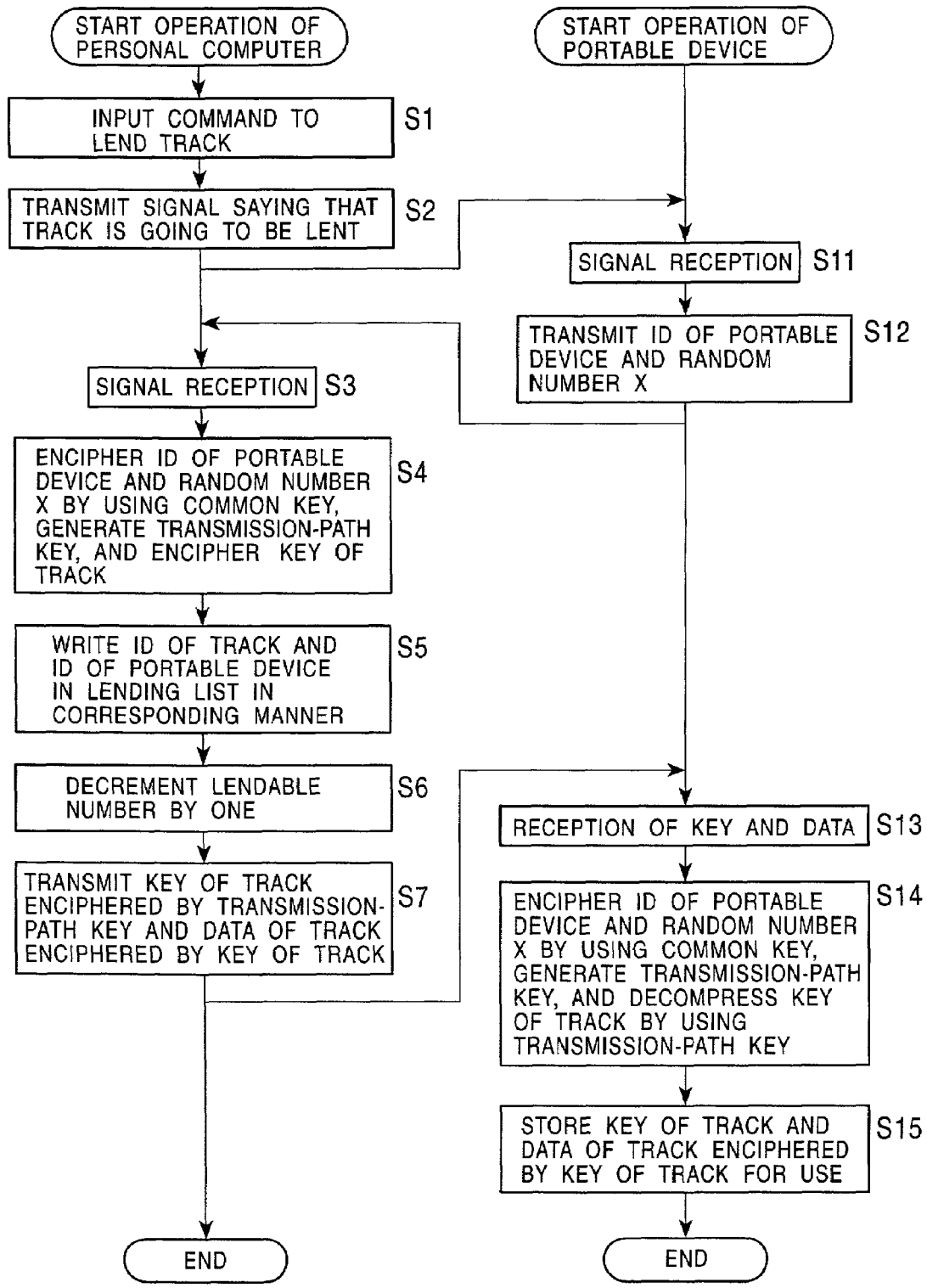
FIG. 4 is a flowchart illustrating processing steps performed when the personal computer 1 lends content to the portable device 3.

FIG. 4 is a flowchart illustrating processing steps performed when the personal computer 1 lends the content to the portable device 3.

At step S1, the keyboard 18 or the mouse 19 of the personal computer 1 is operated in order to input a command for lending the content stored in the HDD 21, which is track A in this example, to the portable device 3. Then, at step S2, the CPU 11 transmits a signal indicating that the track A is going to be lent to the portable device 3 via the USB port 23 and the USB cord 2.

At step S11, the CPU 51 of the portable device 3 receives the signal transmitted from the personal computer 1 via the USB cord 2, the USB connector 65, and the USB controller 66. At step S12, the CPU 51 generates a random number (hereinafter referred to as the random number X), and transmits it along with an ID of the portable device 3, which is stored in the ROM 52, to the personal computer 1 via the USB controller 66, the USB connector 65, and the USB cord 3. The random number X is recorded on the RAM 53, for example.

At step S3, the CPU 11 of the personal computer 1 receives the random number X and the ID of the portable device 3 via the USB cord 2 and the USB port 23. At step S4, the CPU 11 enciphers the ID and the random number X by using a common key that can also be used by the portable device 3, generates a transmission-path key, and enciphers the key of the track A stored in the HDD 21 by using the transmission-path key.

At step S5, the CPU 11 writes the ID of the track A and the ID of the portable device 3 in a corresponding manner in a lending list stored in the HDD 21, as shown in FIG. 5.

The lending list has a field where the ID of a track that is lent is written and a field where the ID of a borrower is written. When one track is lent to a plurality of devices, the plurality of IDs of the devices is written corresponding to the ID of the track.

At step S6, the CPU 11 decrements the lendable number of the track A by one, which is stored in the HDD 21.

At step S7, the CPU 11 transmits the key of the track A, which is enciphered by using the transmission-path key at step S4, and the data of the track A, which is enciphered by using the key of the track A, to the portable device 3 via the USB cord 2.

At step S13, the CPU 51 of the portable device 3 receives the key of the track A, which is enciphered by using the transmission-path key, and the data of the track A, which is enciphered by using the key of the track A.

At step S14, the CPU 51 enciphers the ID of the portable device 3 and the random number X generated at step S12 by using the common key and thereby generates a transmission-path key. Then, the CPU 51 decompresses the key of the track A received at step S13, which is enciphered by the transmission-path key, by using the transmission-path key.

At step S15, the CPU 51 writes and stores the key of the track A which is decompressed at step S14, and the data of the track A which is enciphered by the key of the track A in the flash memory 59 via the flash-memory controller 60.

Accordingly, the portable device 3 can decompress the data of the track A and reproduce it as required by using the key of the track A.

The key of the track A, which enciphers the data of the track A, is enciphered by using the common key that can be used by only the personal computer 1, which is the lender, and the portable device 3, which is the borrower. Therefore, the portable device 3 cannot lend the track A to the other device in an unauthorized manner, that is, the other device cannot reproduce the track A since they do not have the common key.

Figure 6:
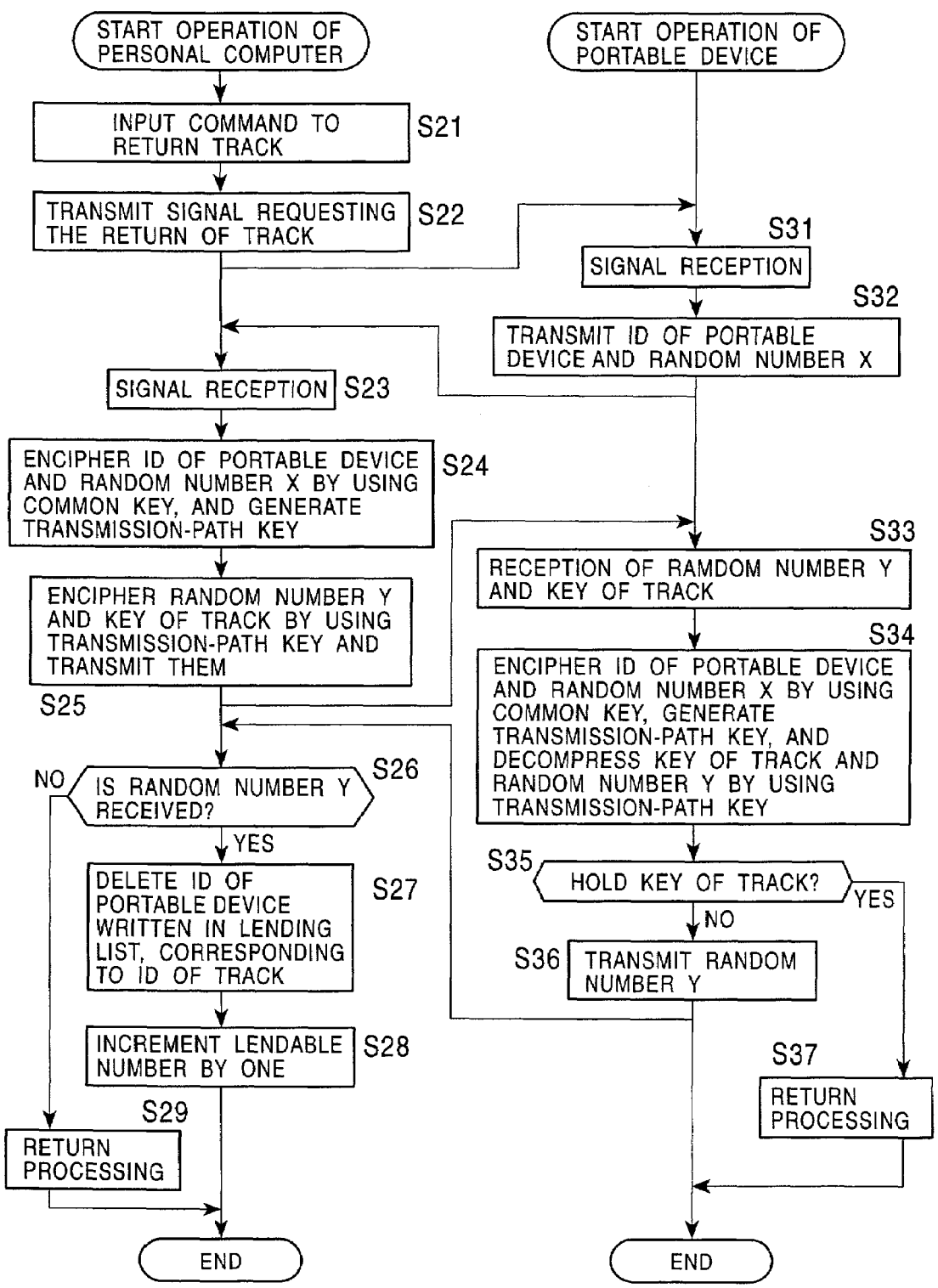
FIG. 6 is a flowchart illustrating processing steps performed for returning a track A borrowed by the portable device 3 to the personal computer 1.

FIG. 6 is a flowchart illustrating the processing steps performed when the track A borrowed by the portable device 3 is returned to the personal computer 1.

At step S21, a command for returning the track A that is lent to the portable device 3 is input to the CPU 11 by operating the keyboard 18 or the mouse 19 of the personal computer 1. Then, the CPU 11 transmits a signal that requests the return of the track A to the portable device 3 at step S22.

At step S31, the CPU 51 of the portable device 3 receives the signal requesting the return of the track A from the personal computer 1. Then, at step S32, the CPU 51 generates a random number X and transmits the ID of the personal device 3 to the personal computer 1.

At step S23, the CPU 11 of the personal computer 1 receives the random number X and the ID of the portable device 3 from the portable device 3. Then, at step S24, the CPU 11 enciphers the received random number X and the ID of the portable device 3 by using the common key and thereby generates a transmission-path key.

At step S25, the CPU 11 generates a random number (hereinafter referred to as the random number Y) and enciphers the random number Y and the key of the track A by using the transmission-path key, and transmits them to the portable device 3.

At step S33, the CPU 51 of the portable device 3 receives the random number Y and the key of the track A that are enciphered by using the transmission-path key from the personal computer 1.

At step S34, the CPU 51 enciphers the ID of the portable device 3 and the random number X by using the common key and thereby generates the transmission-path key. By using the transmission-path key, the CPU 51 decompresses the random number Y and the key of the track A that are enciphered by using the transmission-path key.

At step S35, the CPU 51 determines whether the same thing as the key of the track A that has been decompressed at step S34 is stored in the flash memory 59. When the CPU 51 determines that the same thing is not stored in the flash memory 59, it advances to step S36 and transmits the plain text of the random number Y that has been decompressed at step S34 to the personal computer 1.

At step S26, the CPU 11 of the personal computer 1 determines whether the plain text of the random number Y has been received or not. If the CPU 11 determines that the plain text has been received, it advances to step S27, and deletes the ID of the portable device 3 written in the lending list so as to correspond to the ID of the track A. At step S28, the CPU 11 increments the lendable number by one and thereby restores the lendable number that was decremented by one at step S6 shown in FIG. 4.

Thus, even when the key of the lent track A or the data thereof does not exist in the portable device 3, the return of the track A can be confirmed and therefore the lendable number is restored. For example, even when the track A is deleted by the portable device 3 (the flash memory 59) that is incorrectly formatted and no longer exists in the portable device 3, the track A can be returned.

Since the track A can be returned even when the track A has been deleted for reserving an area for storing other data, the memory of the portable device 3 can be efficiently used.

As described above, the key of the track A, which enciphers the data of the track A, is enciphered by using the common key that can be used only by the personal computer 1, which is the lender, and by the portable device 3, which is the borrower. Therefore, the portable device 3 cannot lend the track A to other devices in an unauthorized manner. When the key of the lent track A or the data thereof does not exist in the portable device 3, it means that the track A is held in only the personal computer 1. Accordingly, the personal computer 1 can determine that the track A has been returned.

Incidentally, when the personal computer 1 determines that the plain text of the random number Y is not received at step S26, that is, when the personal computer 1 determines that the portable device 3 holds the key of the track A at step S35 and does not perform the processing at step S36, the personal computer 1 and the portable device 3 respectively perform the normal return processing at step S29 and at step S37. Accordingly, the key of the track A and the data thereof held in the portable device 3 are deleted, whereby the lendable number of the personal computer 1 is incremented by one and is thereby restored to its original value.

Figure 7:
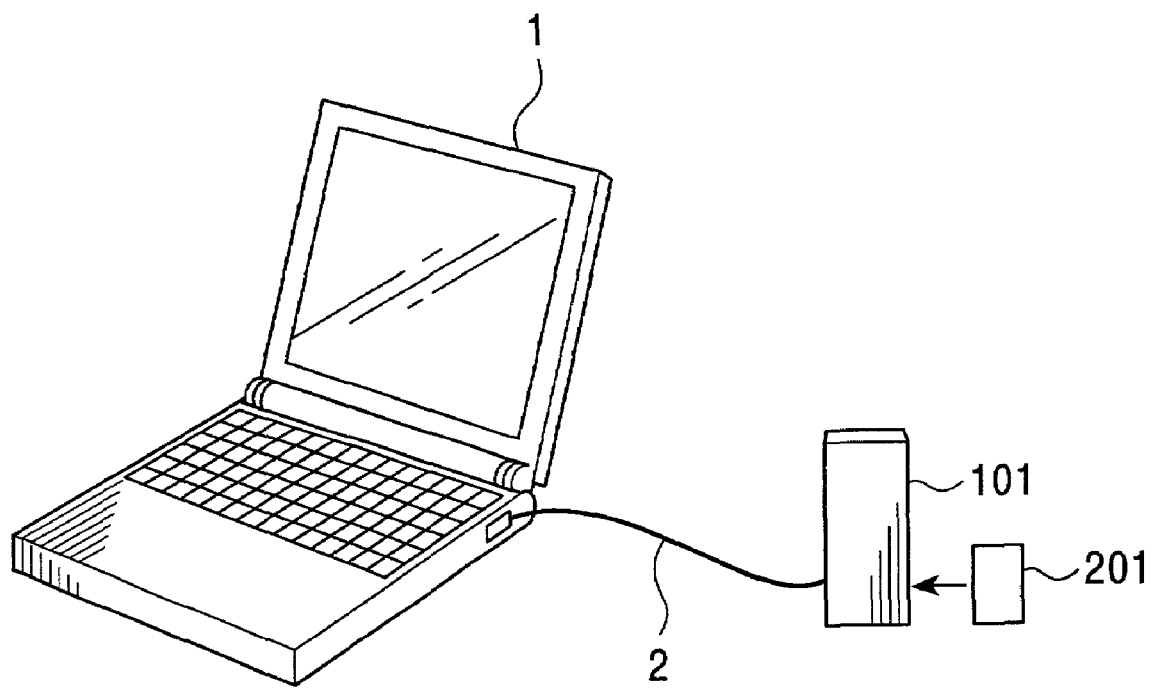
FIG. 7 illustrates the configuration of another exemplary content-lending system according to the present invention.

FIG. 7 illustrates the configuration of another exemplary content-lending system according to the present invention.

In this system, a portable device 101 is provided as a replacement for the portable device 3 used in the content-lending system shown in FIG. 1.

On the portable device 101, the flash memory 59 of the portable device 3 is mounted as a memory card 201.

The memory card 201 stores content lent from the personal computer 1 via the portable device 101 and controls a right-controlling list, which is described later.

Figure 8:
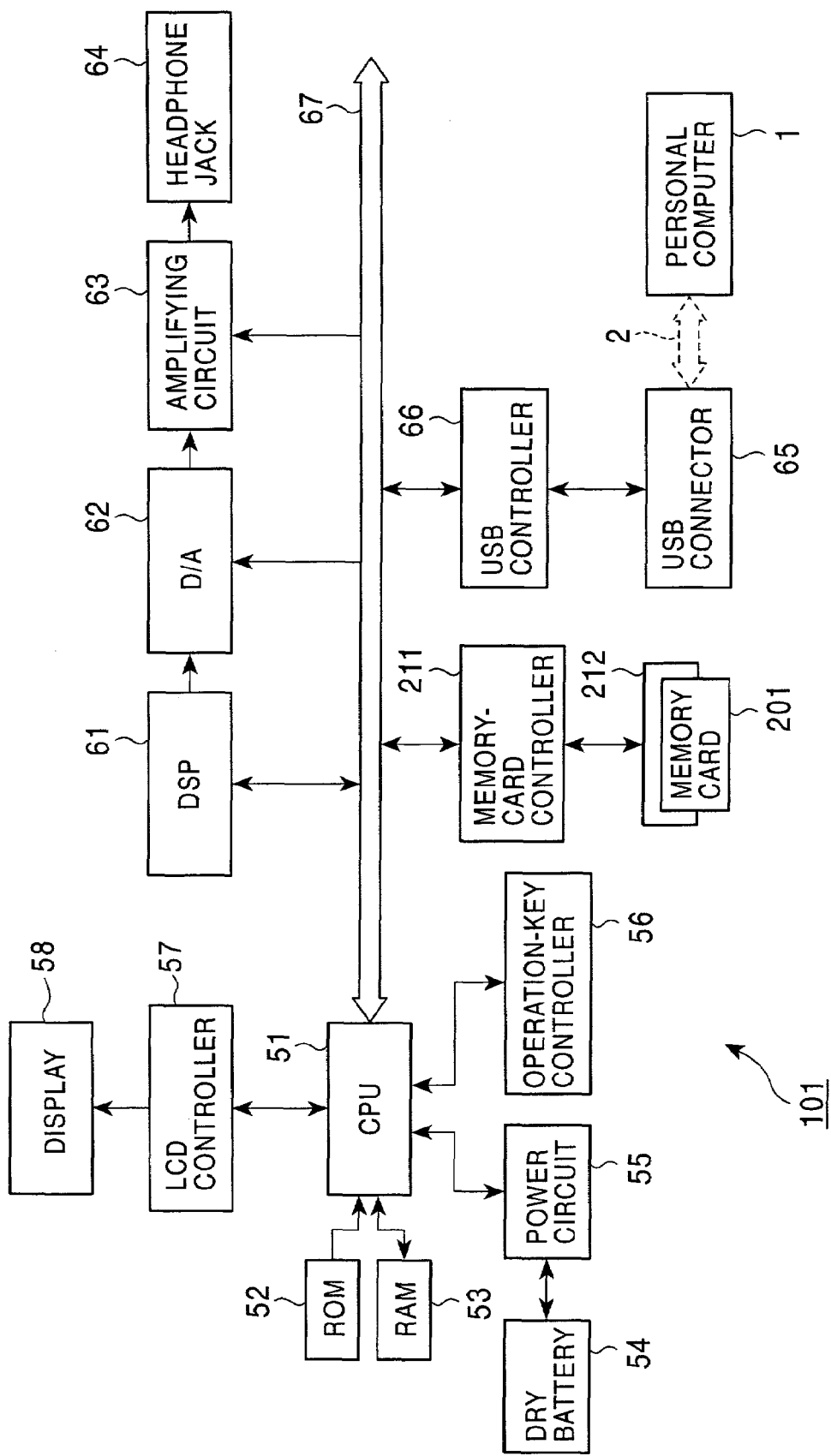
FIG. 8 is a block diagram illustrating the configuration of an exemplary portable device 101 shown in FIG. 7.

FIG. 8 illustrates the configuration of the portable device 101. This portable device 101 comprises a memory-card controller 211 as a replacement for the flash-memory controller 60 of the portable device 3 shown in FIG. 3. To the memory-card controller 211, a slot 212 for mounting the memory card 201 therein is connected.

Figure 9:
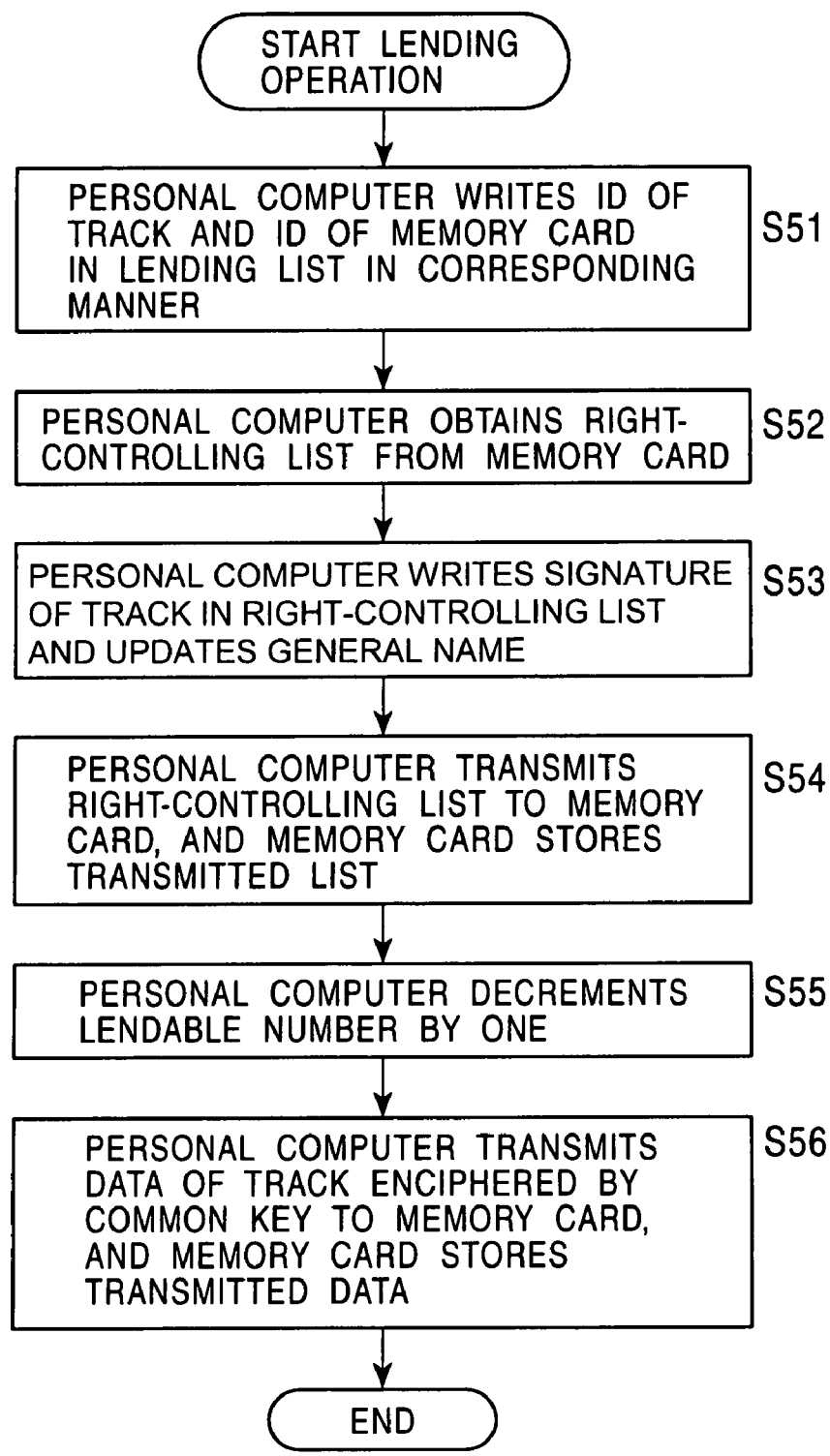
FIG. 9 is a flowchart illustrating processing steps performed when a memory card 201 borrows the track A from the personal computer 1.

FIG. 9 is a flowchart illustrating processing steps performed when the personal computer 1 lends the track A to the memory card 201.

At step S51, the personal computer 1 writes the ID of the track A and that of the memory card 201 in a corresponding manner in the lending list stored in the HDD 21.

At step S52, the personal computer 1 communicates with the portable device 101, and obtains a right-controlling list controlled by the memory card 201 mounted on the portable device 101.

At step S53, the personal computer 1 writes the signature of the track A obtained by enciphering the ID of the track A and the controlling information thereof such as the ID, the prescribed viewing time, and so forth of the track A in the right-controlling list obtained at step S52 by using the common key, and updates the general name.

Figure 10:
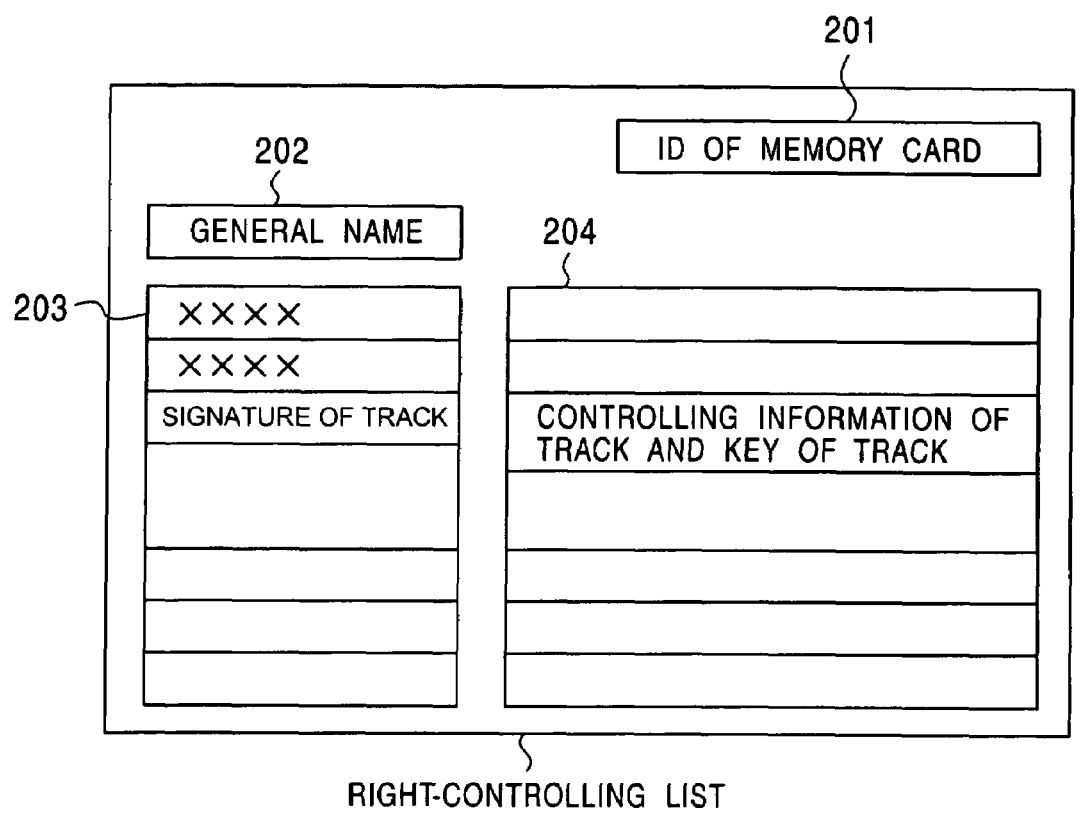
FIG. 10 shows a right-controlling list.

FIG. 10 shows the right-controlling list having a field 201 where the ID of the memory card 201 can be written, a field 202 where the general name can be written, a field 203 where various names of tracks stored in the memory card 201 or lent can be written, and a field 204 where the controlling information and the key of the track can be written.

At step S53, the personal computer 1 writes the signature of the track A obtained by enciphering the key and the controlling information of the track A in a predetermined space of the field 203. Then, the personal computer 1 calculates, for example, the hash value of the tracks written in the field 203 and writes it in the field 202 as the general name. Further, the personal computer 1 writes the controlling information of the track A and the key thereof in the field 204 so as to correspond them to the signature of the track A.

At step S54, the personal computer 1 transmits the right-controlling list in which the predetermined information is written at step S53 to the portable device 101. Then, the portable device 101 transmits the right-controlling list to the memory card 201 and makes the memory card 201 store it.

At step S55, the personal computer 1 decrements the lendable number by one and transmits the data of the track A enciphered by using the common key to the portable device 101. The portable device 101 transmits the data to the memory card 201 and makes the memory card 201 store it. The processing steps are thereby completed.

Figure 11:
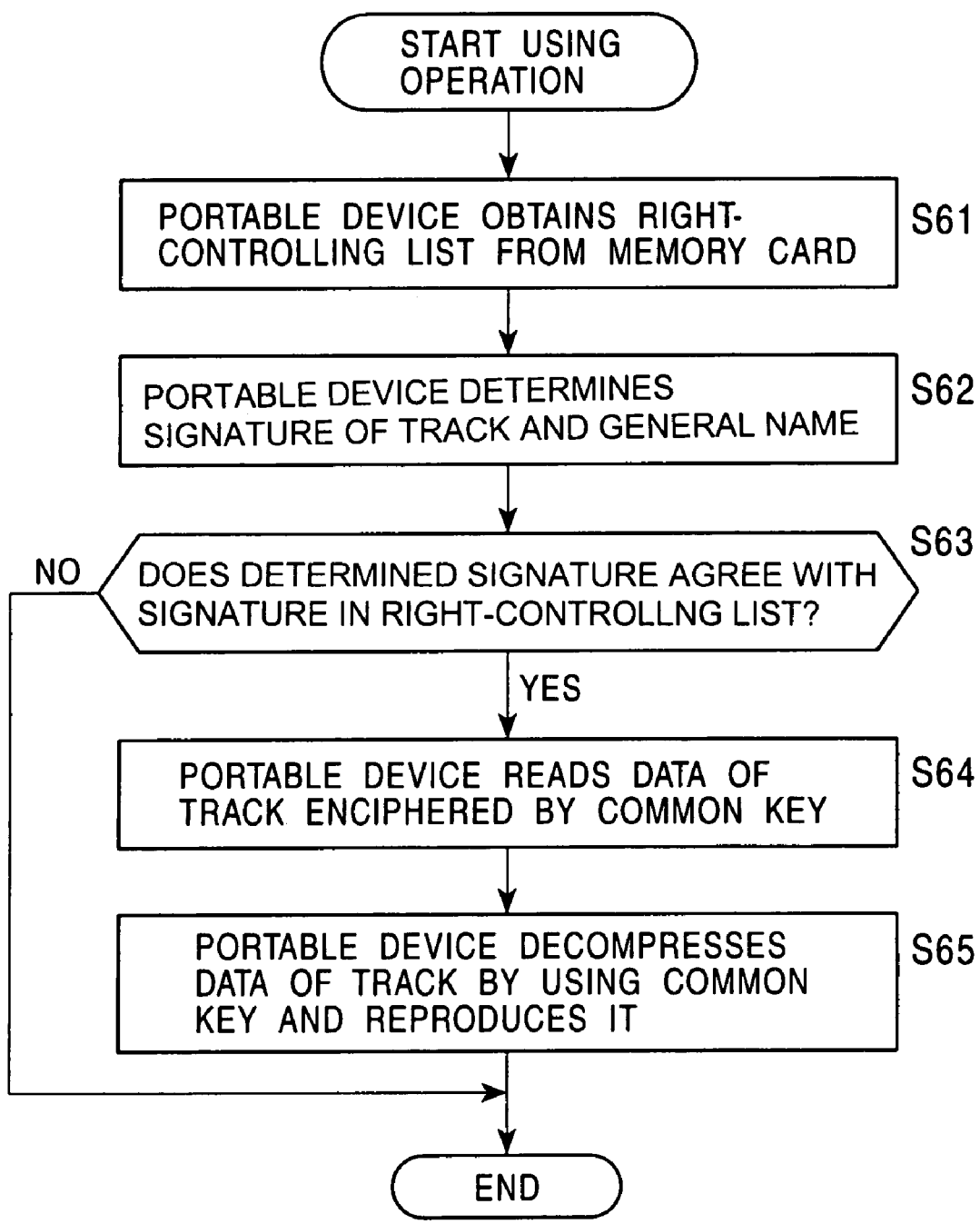
FIG. 11 is a flowchart illustrating processing steps performed for using the track A borrowed by the memory card 201 from the personal computer 1.

FIG. 11 is a flowchart illustrating processing steps performed for using the track A lent from the personal computer 1 to the memory card 201.

At step S61, the portable device 101 obtains the right-controlling list from the memory card 201. At step S62, the portable device 101 calculates the signature of the track A by enciphering the controlling information of the track A and the key thereof, which are written in the field 204, corresponding to the signature of the track A, by using the common key. The portable device 101 also determines the names of the other tracks in the same manner, and then determines the general name by using all the determined names of the other tracks.

At step S63, the portable device 101 determines whether the name of the track A and the general name, which are calculated at step S62, respectively agree with the signature of the track A and the general name in the right-controlling list or not. When the portable device 101 determines that they agree with each other, it advances to step S64.

At step S64, the portable device 101 reads the data of the track A that is enciphered by using the common key and is stored in the memory card 201, and decompresses the data by using the common key and reproduces it at step S65. The processing steps are thereby completed.

At step 63, when the portable device 101 determines that the calculated signatures and the signatures in the right-controlling list do not agree with each other, the processing steps at steps S64 and S65 are omitted whereby the processing steps are completed. That is, the track A is not reproduced in such case.

Figure 12:
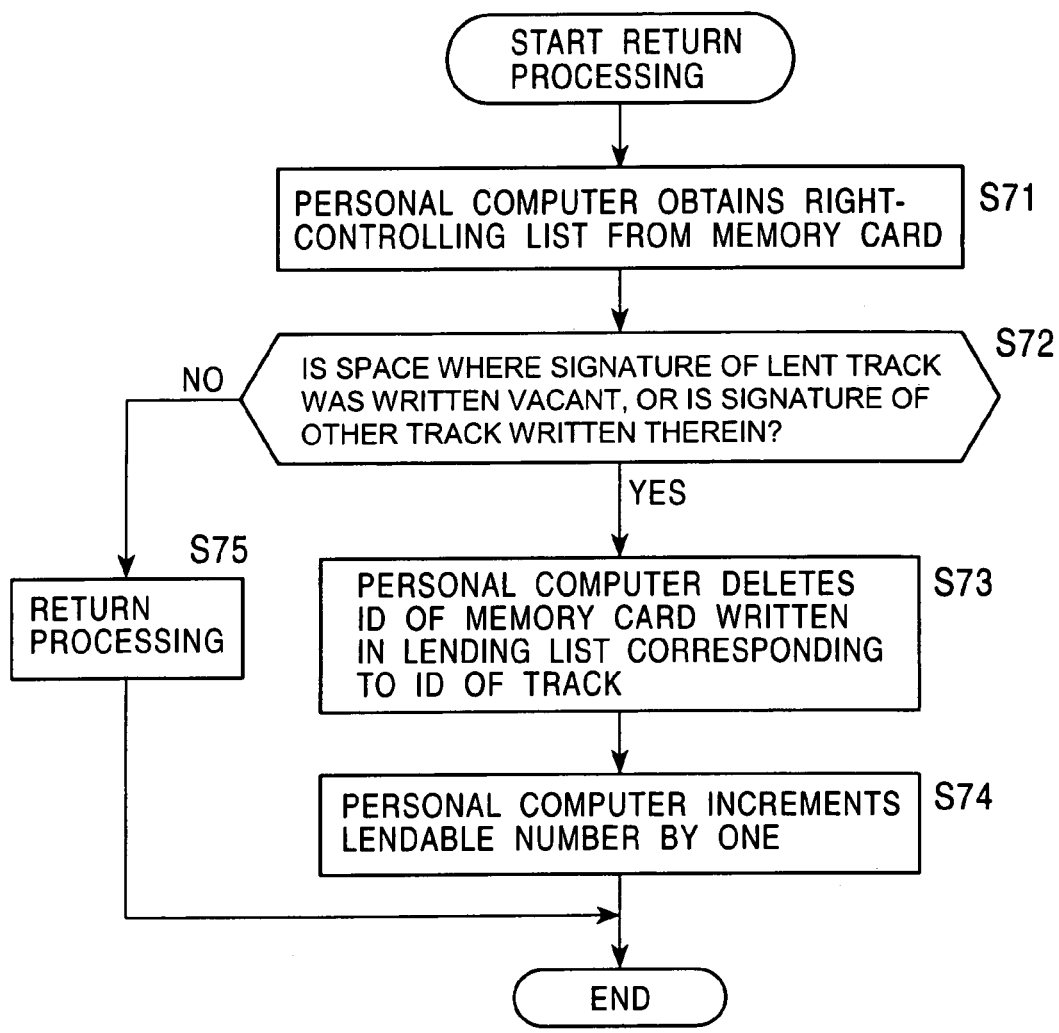
FIG. 12 is a flowchart illustrating processing steps performed for returning the track A borrowed by the memory card 201 to the personal computer 1.

FIG. 12 is a flowchart illustrating processing steps performed for returning the track A lent from the personal computer 1 to the memory card 201 to the personal computer 1.

At step S71, the personal computer 1 obtains the right-controlling list from the memory card 201.

At step S72, the personal computer 1 determines whether the space of the right-controlling list where the signature of track A was written when the track A was lent is vacant, or a different value, that is, other signature of a different track is written therein. When the personal computer 1 determines that the space is vacant or the other name of the different track is written therein, the personal computer 1 advances to step S73.

At step S73, the personal computer 1 deletes the ID of the memory card 201 which is written in the lending list so as to correspond to the ID of the track A. Then, at step S74, the personal computer 1 increments the lendable number by one and thereby restores it to a predetermined value. Thus, the processing steps are completed.

When the personal computer 1 determines that the signature of the track A is still written in the same space as it was when the track A was lent at step S72, the personal computer 1 advances to step S75, and performs the normal return processing. Accordingly, the controlling information of the track A, the key thereof, and the data thereof, which are held in the portable device 101, are deleted. Further, the lendable number of the personal computer 1 is incremented by one and is thereby restored.

Figure 13:
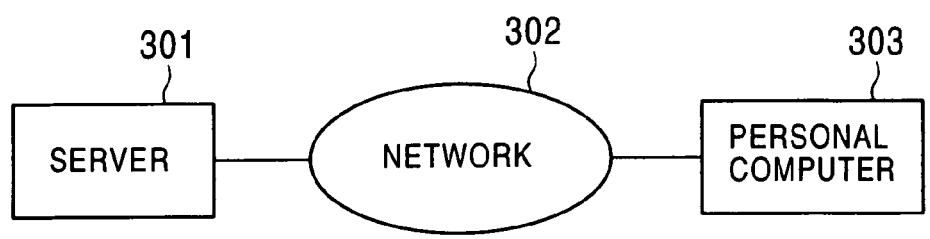
FIG. 13 illustrates the configuration of another exemplary content-lending system according to the present invention.

FIG. 13 shows the configuration of another exemplary content-lending system according to the present invention.

This system comprises a server 301 connected to a personal computer 303 via a network 302.

The server 301 has software that is lendable as many times as the predetermined lendable number. Lending of the software is controlled on the basis of the lendable number.

More specifically, the server 301 decrements the lendable number when it transmits or lends the software to the personal computer 303.

When the software is returned, the server 301 increments or restores the lendable number. However, when the lent software does not exist in (or is deleted from) the personal computer 303, the server 301 confirms the return of the software, and increments the lendable number.

The personal computer 303 cannot lend the software lent from the server 301 to the other personal computer in an unauthorized manner. That is to say, when the lent software does not exist in the personal computer 303, which is the borrower, it means that the software is held in only the server 301. Therefore, the server 301 can determine that the software is returned.

The personal computer 303 executes the software lent from the server 301 and performs a predetermined processing. The personal computer 303 controls a right-controlling list.

Figure 14:
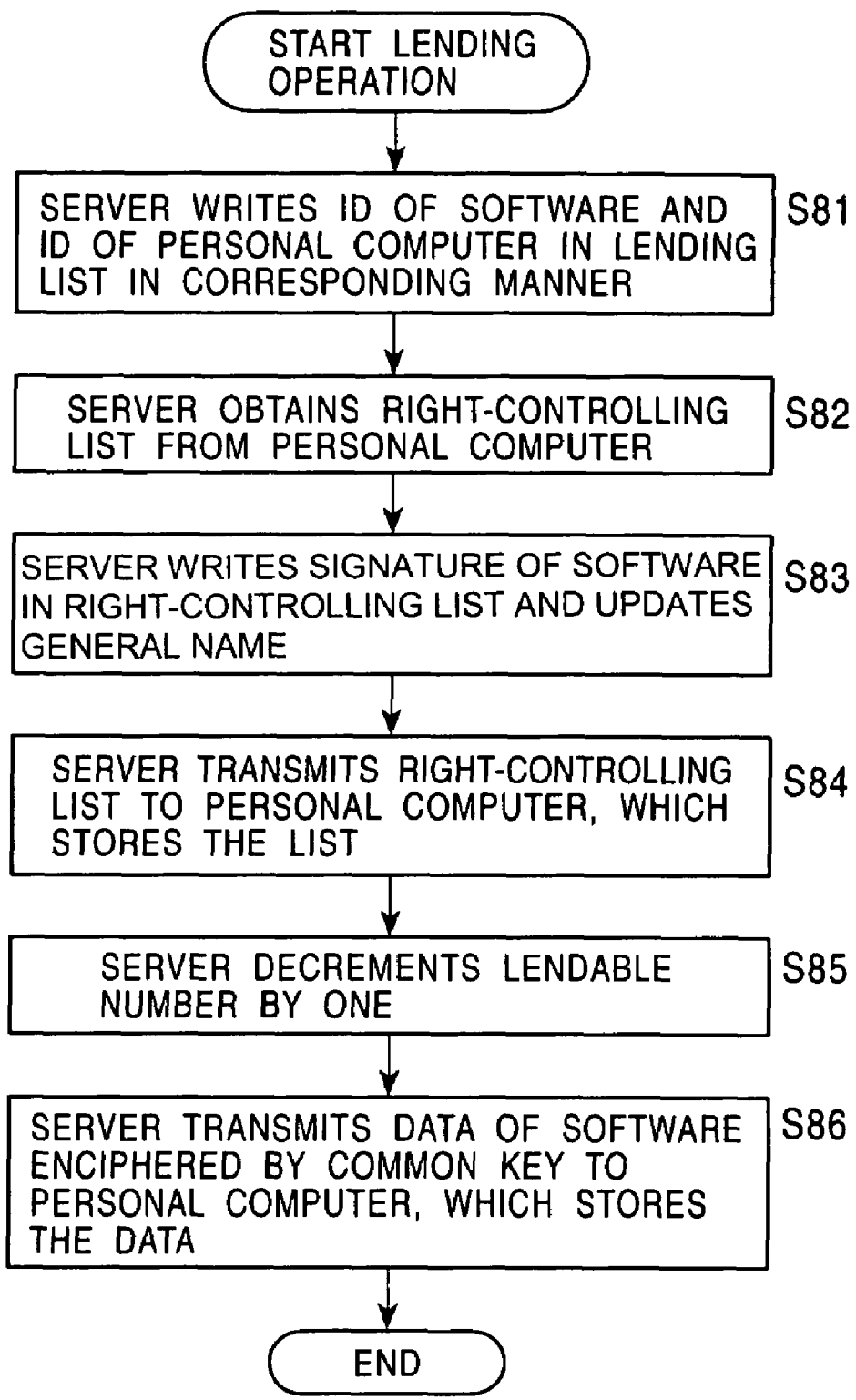
FIG. 14 is a flowchart illustrating processing steps performed when a personal computer 303 borrows software A from a server 301.

FIG. 14 is a flowchart illustrating processing steps performed when the server 301 lends software A to the personal computer 303.

At step S81, the server 301 writes the ID of the software A and that of the personal computer 303 in a corresponding manner in a lending list controlled by the server 301.

At step S82, the server 301 communicates with the personal computer 303 and obtains the right-controlling list. Then, the server 301 writes the signature of the software A in the obtained right-controlling list at step S83. The signature is obtained by enciphering the key of the software A and the controlling information thereof such as the ID and the predetermined using time by using the common key that can also be used by the personal computer 303. Further, the server 301 updates the general name, which is the hash value of all the names of the software written in the right controlling list, the software being lent to the personal computer 303.

At step S84, the server 301 transmits the right-controlling list, wherein the predetermined information was written at step S83, to the personal computer 303. The personal computer 303 stores the right-controlling list.

At step S85, the server 301 decrements the lendable number by one, and further transmits the data of the software A which is enciphered by using the common key to the personal computer 303 at step S86. The personal computer 303 stores the data, whereby the processing steps are completed.

Figure 15:
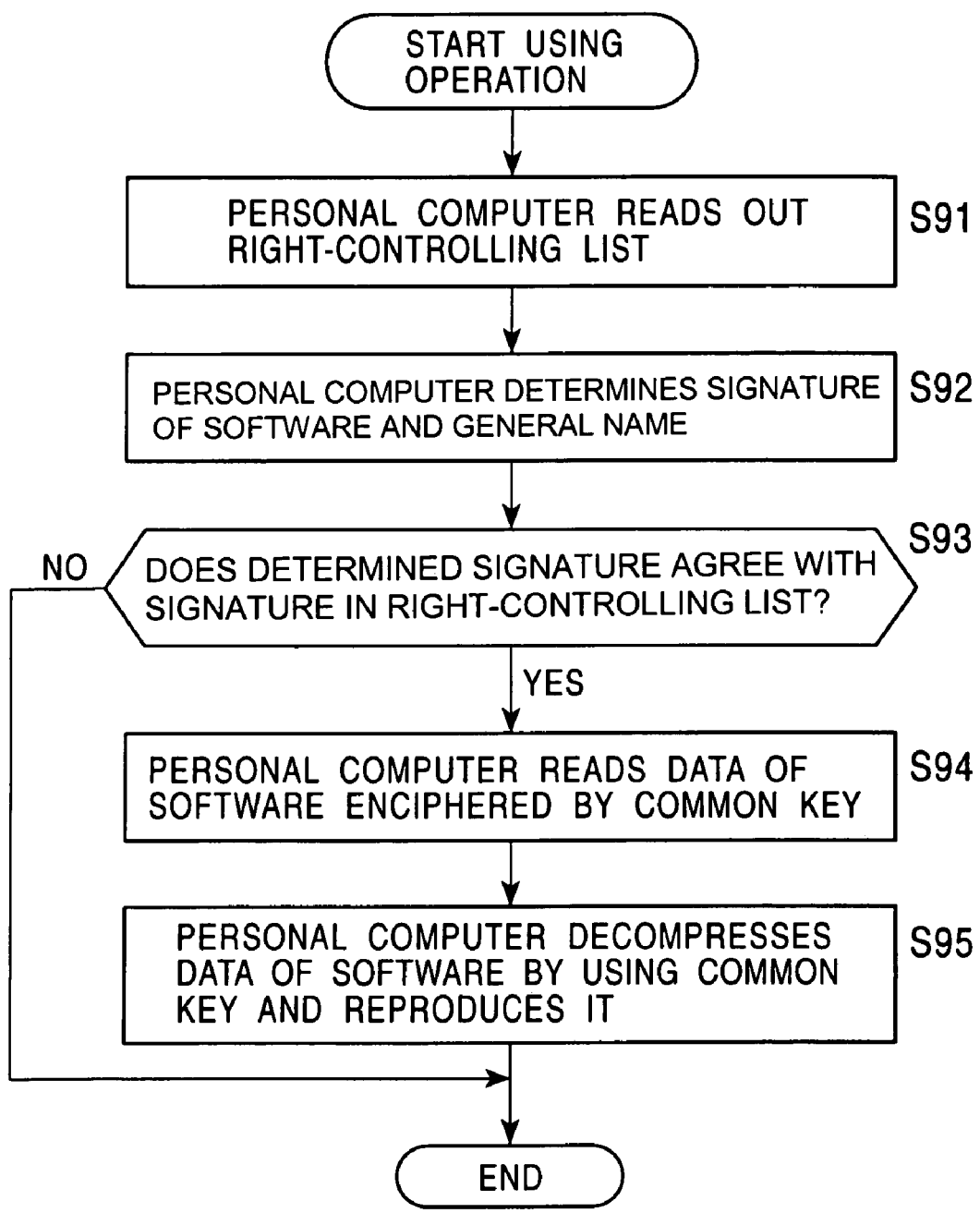
FIG. 15 is a flowchart illustrating processing steps performed for using the software A borrowed by the personal computer 303 from the server 301.

FIG. 15 is a flowchart illustrating processing steps performed for using the software A lent from the server 301 to the personal computer 303.

The personal computer 303 reads out the right controlling list at step S91, and further determines the signature of the software A by enciphering the controlling information of the software A and the key thereof that are written corresponding to the name of the software A by using the common key at step S92. The personal computer 303 also determines the signatures of other software in the same manner and further determines the general name by using all the determined signatures of the software.

At step S93, the personal computer 303 determines whether the signature of the software A and the general name that are calculated at step S92 agree with the signature of the software A and the general name in the right-controlling list or not. When the personal computer 303 determines that they agree with each other, it advances to step S94.

At step S94, the personal computer 303 reads the data of the software A stored therein, which is enciphered by using the common key. Further, the personal computer 303 decompresses the data by using the common key and executes it at step S95, whereby the processing steps are completed.

When the personal computer 303 determines that the determined signatures and the signatures in the right-controlling list do not agree with each other at step S93, steps S94 and S95 are omitted, whereby the processing steps are completed. That is to say, the software A cannot be executed in such case.

Figure 16:
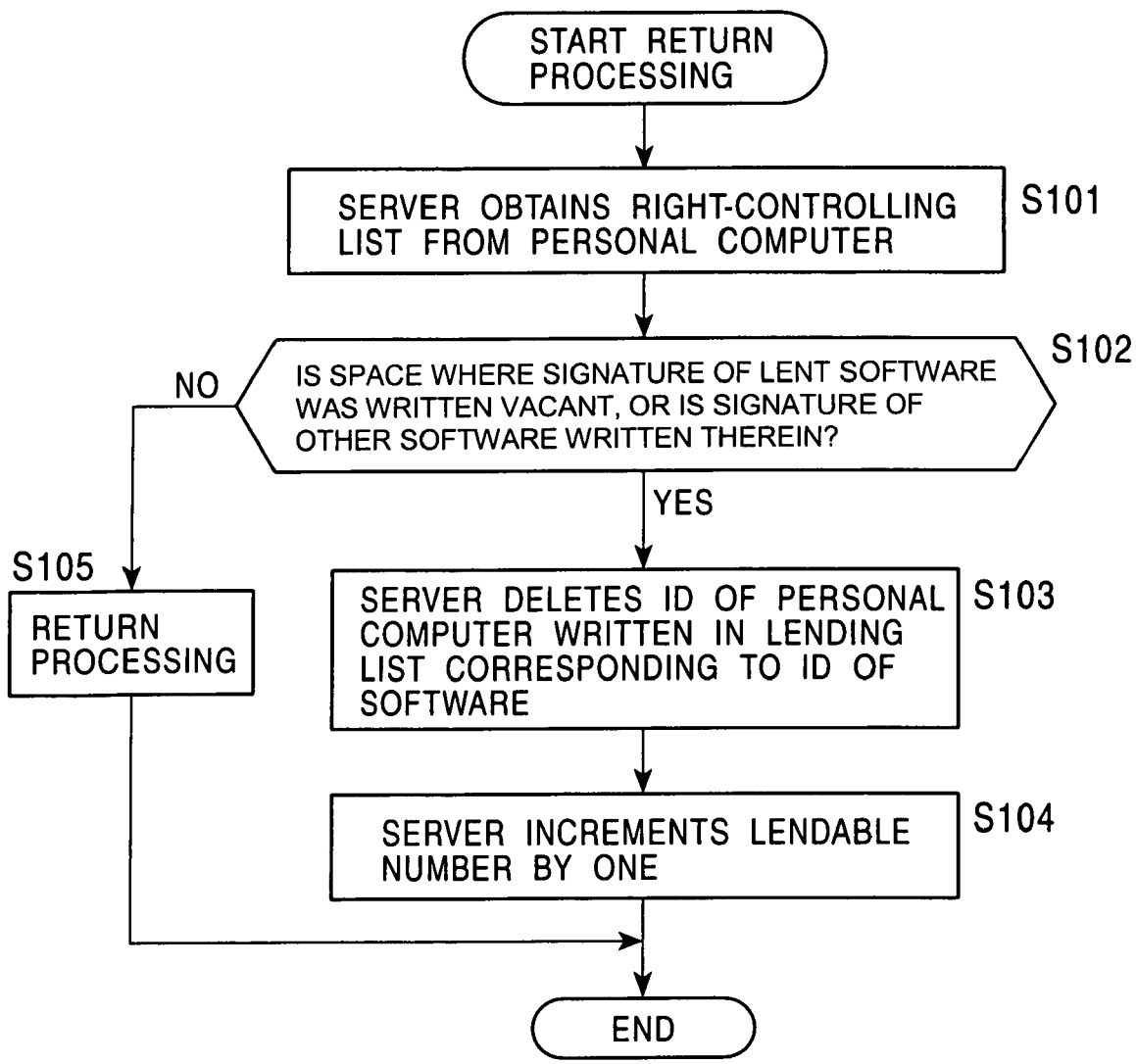
FIG. 16 is a flowchart illustrating processing steps performed for returning the software A borrowed by the personal computer 303 to the server 301.

FIG. 16 is a flowchart illustrating processing steps performed for returning the software borrowed by the personal computer 303 to the server 301.

At step S101, the server 301 obtains the right-controlling list from the personal computer 303.

At step S102, the server 301 determines whether the space of the right-controlling list where the signature of software A was written when the software A was lent is vacant, or other signature of other different software is written therein. When the server 301 determines that the space is vacant or the other signature of the different software is written therein, the server 301 advances to step S103.

At step S103, the server 301 deletes the ID of the personal computer 303 which is written in the lending list so as to correspond to the ID of the software A. Then, at step S104, the server 301 increments the lendable number by one and thereby restores it. Thus, the processing steps are completed.

When the server 301 determines that the signature of software A is still written in the space as it was when the software A was lent at step S102, the server 301 advances to step S105, and performs the normal return processing. Accordingly, the controlling information of the software A, the key thereof, and the data thereof, which are held in the personal computer 303, are deleted. Further, the lendable number of the server 301 is incremented by one and is thereby restored to its original value.

In the above-described embodiments, the content was described as a track or software. However, the present invention can be applied to a case where the content is a book, that is, the text data thereof.

The above-described processing can be executed not only by hardware but also by software having a program therein. In such case, the program stored in program-storing media is installed in a computer mounted inside dedicated-purpose hardware, or in a general personal computer, which can have various functions by using various programs installed therein.

The program-storing media or recording media shown in FIG. 2, which are distributed to the user separate from the computer, include not only package media such as the magnetic disc 41 storing a program therein (including a floppy disc), the optical disc 42 which may be a CD-ROM or a DVD, a magneto-optical disc 43 which may be an MD, and the semiconductor memory 44 which is a packaged medium, but also the ROM 12, the HDD 21 and so forth, which store programs therein and are already mounted inside a computer for use.

Further, the steps of writing the programs stored in the above-described recording mediums include not only processing steps performed in orderly sequence but also processing steps performed in parallel or separately.

What is claimed is:

1. A first information-processing device comprising:
   transmission means for transmitting a content and information necessary for the content to a second device; and,
   controlling means for controlling copying of the content to the second device on the basis of an allowable number of copies, the controlling means decrementing the allowable number each time the content and information necessary for the content is transmitted to the second device and storing an identification of the second device in a memory upon copying the content to the second device, the controlling means deleting the identification of the second device in the memory and the content and the information necessary for the content from the second device when the content and information necessary for the content is returned to the first information-processing device, the controlling means incrementing the allowable number and deleting the identification of the second device from the memory if the controlling means confirms that the second device no longer stores the copied content and the memory still stores the identification of the second device therein.

2. An information-processing device according to claim 1, wherein the transmission means transmits a random number and the information necessary for the content enciphered by a common key shared with the device, and wherein
   a managing means increments the allowable number upon receiving the plain text of the random number transmitted from the device if the device does not have the information necessary for the content.

3. An information-processing device according to claim 1, wherein the information necessary for the content includes a signature of the information necessary for the content.

4. An information-processing device according to claim 3, further comprising:
   storing means for storing the signature transmitted to the device, and
   reception means for receiving the signature stored in the device from the device,
   wherein a managing means increments the allowable number of the content if the signature of the information is not received at the reception means.

5. An information-processing device according to claim 1, wherein the information necessary for the content includes a content key of the information necessary for the content.

6. An information-processing device according to claim 5, further comprising:
   storing means for storing the content key transmitted to the device, and
   reception means for receiving the content key stored in the device from the device,
   wherein a managing means increments the allowable number of the content if the content key of the information is not received at the reception means.

7. An information-processing device according to claim 1, wherein
   the transmission means transmits request for return of the content to the second device,
   the control means receives a first random number and the information necessary for the content from the second device,
   the transmission means transmits a second random number and the information necessary for the content enciphered by a common key shared with the second device, and
   a managing means increments the allowable number upon receiving the plain text of the second of random number transmitted from the second device if the second device does not have the information necessary for the content.

8. An information-processing method comprising:
   transmitting a content and information necessary for using the content to a first device;
   controlling copying of the content on the basis of an allowable number of copies, the controlling including:
   decrementing the allowable number each time the content and the information necessary for using the content are transmitted to the first device using the content at the first transmission step;
   storing, in a memory in a second device, each time the content and the information necessary for using the content are transmitted to the first device, an identification of the first device;
   confirming, subsequently, that the first device has deleted the content and information necessary for the content, and confirming that the identification of the device is present in the memory of the second device;
   incrementing the allowable number of copies on the basis of the confirming.

9. A computer readable medium, including computer program instructions that cause a computer to implement a method of managing the transfer of content, the method comprising:
   transmitting a content and information necessary for using the content to a first device;
   controlling copying of the content on the basis of an allowable number of copies, the controlling including:
   decrementing the allowable number each time the content and the information necessary for using the content are transmitted to the first device;
   storing, in a memory in a second device, each time the content and the information necessary for using the con- tent are transmitted to the first device, an identification of the first device;
   confirming, subsequently, that the first device has deleted the content and information necessary for the content, and confirming that the identification of the first device is present in the memory of the second device;
   incrementing the allowable number of copies on the basis of the confirming.

10. An information-processing device, comprising:

transmission unit configured to transmit content to a device storing the content;

manage unit configured to manage a number of copies of the content transmitted to the device and a device identification of the device, to which the content is transmitted, in a list; and, control unit configured to increment the number of copies of the content by one in response to request of returning the content from the device if the content is not returned; but, a device identification of the device is managed in the list and the content is not stored in the device, and storing an identification of the second device in a memory upon copying the content to the second device, the control unit deleting the identification of the second device in the memory and the content and the information necessary for the content in the second device when the content and information necessary for the content is returned to the information-processing device, the control unit incrementing the allowable number and deleting the identification of the second device from the memory if the control unit confirms that the second device no longer stores the copied content and the memory still stores the identification of the second device therein.

* * * * *